United States Patent [19]

Yoshitsugu et al.

[11] Patent Number: 4,580,812
[45] Date of Patent: Apr. 8, 1986

[54] SEATBELT SYSTEM

[75] Inventors: Noritada Yoshitsugu; Motonobu Sugiura; Yutaka Matsuzaki, all of Toyota, Japan

[73] Assignee: Toyota Jidosha Kabushiki Kaisha, Toyota, Japan

[21] Appl. No.: 636,606

[22] Filed: Aug. 1, 1984

[30] Foreign Application Priority Data

Feb. 22, 1984 [JP] Japan .................. 59-31849

[51] Int. Cl.⁴ ............................... B60R 22/04
[52] U.S. Cl. ..................... 280/802; 297/469
[58] Field of Search .......... 280/802, 803, 804; 297/469, 483

[56] References Cited

U.S. PATENT DOCUMENTS

| | | | |
|---|---|---|---|
| 3,973,786 | 8/1976 | Rogers, Jr. | 280/807 |
| 3,976,305 | 8/1976 | Fieni | 280/802 |
| 4,213,637 | 7/1980 | Mauron | 280/802 |
| 4,361,294 | 11/1982 | Doty | 280/802 |
| 4,373,747 | 2/1983 | Takizawa et al. | 280/802 |
| 4,451,061 | 5/1984 | Takada | 280/802 |

Primary Examiner—Carlton R. Croyle
Assistant Examiner—Timothy S. Thorpe
Attorney, Agent, or Firm—Cushman, Darby & Cushman

[57] ABSTRACT

In a seatbelt system in which an occupant restraining webbing, one end thereof being secured to a door of a vehicle, is moved in directions of a front and a rear of the vehicle in accordance with an opening and a closing of the door and an occupant is automatically fastened by the webbing, when a motor of a webbing retractor is driven in response to a signal from a switch detecting an opened degree of the door, so that a tension of the webbing is reduced.

16 Claims, 16 Drawing Figures

SEATBELT SYSTEM

BACKGROUND OF THE INVENTION

1. Field of the Invention

The present invention relates to a seatbelt system adapted for preventing a movement of an occupant in an emergency situation of a vehicle, especially, of such a type that an occupant restraining webbing is automatically fastened on an occupant when he rides on the vehicle.

2. Description of the Prior Art

Such a seatbelt sytem is such constructed that the occupant is fastened by the webbing when he rides on the vehicle and in the emergency situation of the vehicle the occupant is restrained by the webbing.

For the purpose of fastening automatically the occupant who has just ridden on the vehicle, has been proposed a seatbelt system constructed in such a manner that one end of the webbing is secured to a door of the vehicle and the webbing is driven to be fastened about and to be released from the occupant in response to a closing and an opening of the door. In the seatbelt system the other end of the webbing is retracted by a biasing force into a webbing retractor fixed to a floor of the vehicle.

Accordingly, when the occupant opens the door the one end of the webbing secured to the door is moved in a front direction of the vehicle and simultaneously therewith an intermediate portion of the webbing is unwound from the webbing retractor. A reaction force to the unwinding of the webbing acts as a resistance force to the opening of the door and in some cases the occupant is rubbed by the webbing at the beginning of the movement of the webbing when the door is opened.

SUMMARY OF THE INVENTION

In view of the above fact, the present invention has as its object the provision of a seatbelt system having an occupant restraining webbing, one end thereof being secured to a door of a vehicle and the webbing being automatically fastened about and released from an occupant in response to a closing and an opening of the door, in which a resistance force to the opening of the door can be reduced at a time of the opening and a frictional force occurring between the webbing and the occupant can be decreased at a time of a movement of the webbing.

In the seatbelt system according to the present invention, a retracting force of a retracting means fixed to the vehicle and for retracting the other end of the webbing is changeable, and control means receives a signal from door-opening detecting means for detecting opened degree of the door and controls the retracting means to change the retracting force in accordance with the opened degree of the door, so that a reaction force to an unwinding of the webbing is adjusted so as to make easy the opening of the door and a tension of the webbing is adjusted so as to decrease the frictional force between the webbing and the occupant at the time of the movement of the webbing.

Description will hereinunder be given of embodiments of the present invention with reference to the drawings attached hereto.

BRIEF DESCRIPTION OF THE INVENTION

FIG. 12(A), (B), (C) and (D) are flow charts of the first embodiment; and

Figure 13:
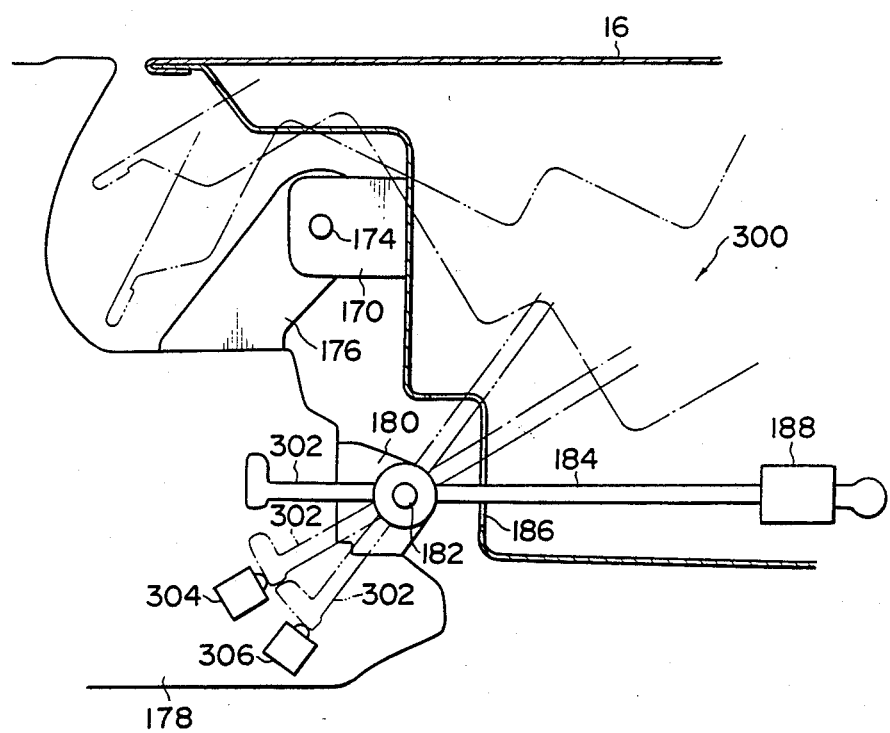

FIG. 13 is a sectional plan view showing a door-opening detecting means used in a second embodiment according to the present invention.

PREFERRED EMBODIMENTS OF THE INVENTION

Figure 1:
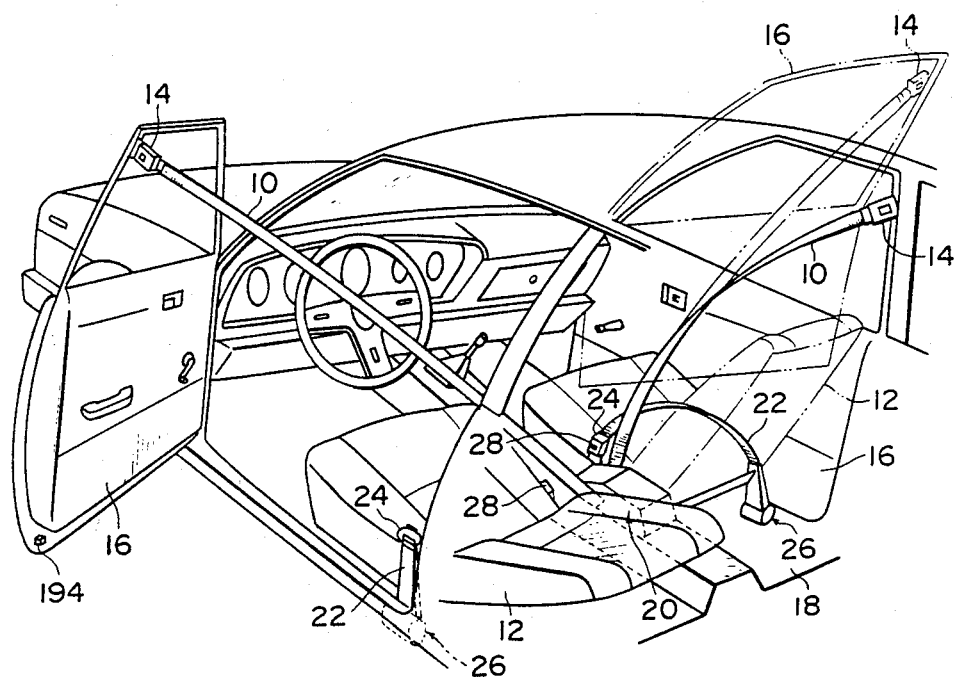
FIG. 1 is a perspective view of an automobile showing an embodiment of a seatbelt system according to the present invention.

In FIG. 1, shown is an automobile to which a seatbelt system according to an embodiment of the present invention is applied. The embodiment is such constructed that a shoulder webbing 10 is automatically fastened about an occupant 30 sitting on a seat 12.

That is to say, the shoulder webbing 10 is secured at its outer end portion regarding a room of the automobile to a rear and upper portion of a door 16 through a shoulder anchor 14 and an inner end portion thereof regarding the room is retracted into a webbing retractor 20 fixed to a center portion of a floor 18 of the automobile, which is retracting means. The shoulder anchor 14 can be such constructed that the shoulder webbing 10 is releasable from the shoulder anchor 14 at need.

Also, disposed at a portion of the floor 18 outside the seat 12 is a lap webbing 22 which can be fastened on the occupant 30 at need. One end portion of the lap webbing 22 is secured to a tongue plate 24 and the other end portion thereof is retracted into another webbing retractor 26 by a biasing force.

Figure 2:
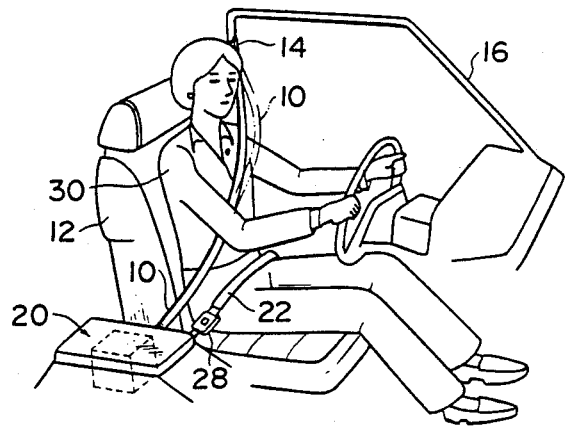
FIG. 2 is a perspective view showing a situation where an occupant is restrained by webbings.
Figure 3:
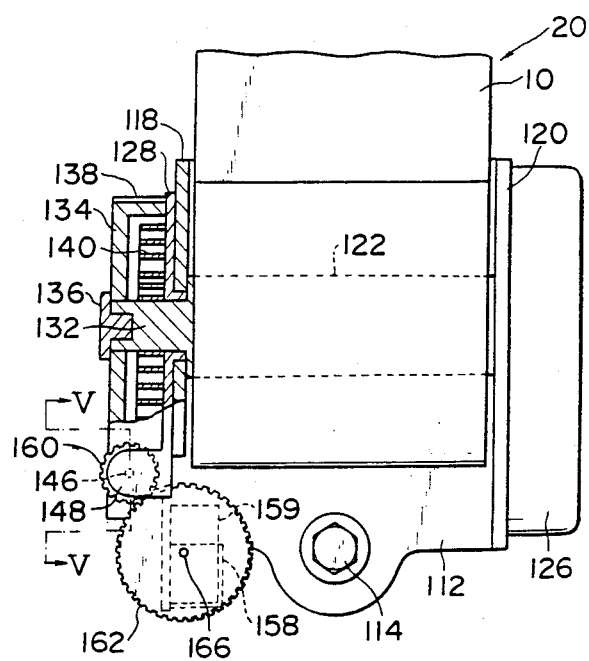
FIG. 3 is a front view showing a webbing retractor used in a first embodiment.

Fixed to a portion of the floor 18 inside the seat 12 is a buckle device 28 opposed to the tongue plate 24. As shown in FIG. 2, the occupant 30 sitting on the seat 12 unwinds the lap webbing 22 manually from the webbing retractor 26 to latch the tongue plate 24 to the buckle device 28, so that he can put himself in a fastened situation of the lap webbing 22. In this connection the webbing retractor 26 houses therein an inertial locking mechanism stopping an unwinding of the lap webbing 22 instantaneously in an emergency situation of the automobile.

Next, the webbing retractor 20 is explained below in detail in accordance with FIGS. 3 to 7.

In the webbing retractor 20, its frame 112 is fixed to the floor 18 through a mounting bolt 114. Extended from both end portions of the frame 112 are a pair of leg plates 118 and 120 parallel to one another.

Journalled on the leg plates 118 and 120 is both end portions of a webbing takeup shaft 122, an intermediate portion thereof being fixed with one end of the shoulder webbing 10 and being retracting the shoulder webbing 10 in layers thereon.

Fixed to an outside of the leg plate 120 between the leg plate 120 and the takeup shaft 122 is an inertial locking mechanism 126. The inertial locking mechanism 126 has a structure usually used, i.e., it is constructed so as to detect an acceleration of the automobile or an unwinding acceleration of the shoulder webbing 10 to stop an unwinding rotation of the takeup shaft 122 urgently in the emergency situation of the automobile.

Fixed to an outside of the leg plate 118 is a plate-shaped holder 128 through screws 130. The takeup shaft 122 is formed at its one end with a small diameter portion 132 piercing the plate-shaped holder 128, a forward end portion of which rotatably supports a spring case 134 at its bottom plate portion. The spring case 134 is prevented from being pulled out of the small diameter portion 132 by a stopper 136 forced into a forward end portion thereof.

In addition, the spring case 134 is formed at its outer peripheral portion with a worm wheel 138 and it is secured at its inner peripheral portion with an outer end of a spiral spring 140. The spiral spring 140 is disposed coaxially with the small diameter portion 132 and it is secured at its inner end to the small diameter portion 132. Accordingly, the spiral spring 140 gives a retracting force for the shoulder webbing 10 to the takeup shaft 122, and when the spring case 134 is rotated in a direction of arrow d shown in FIG. 4 a biasing force of the spiral spring 140 is increased so that the retracting force of the takeup shaft 122 is also increased. On the contrary, when the spring case 134 is rotated in a direction of arrow D shown in FIG. 4 the biasing force of the spiral spring 140 is decreased so that the retracting force is also decreased.

Figure 5:
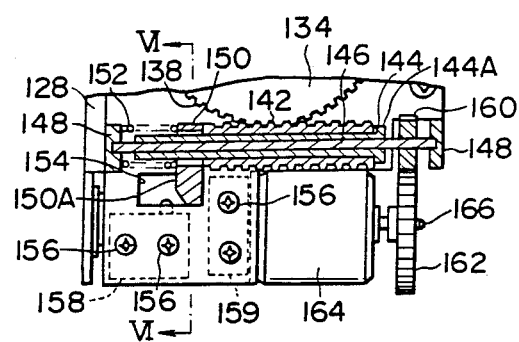
FIG. 5 is a sectional view taken along a line V—V of FIG. 3.
Figure 6:
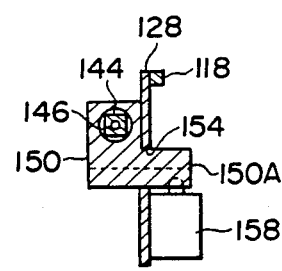
FIG. 6 is a sectional view taken along a line VI—VI of FIG. 5.

A worm 142 engaged with the worm wheel 138 is journalled on brackets 148 of the holder 128 through a guide 144 and a shaft 146, as shown in FIG. 5. That is to say, the shaft 146, both the end portions thereof being rotatably supported by the brackets 148, is fixed at its intermediate portion with the guide 144, and the guide 144 is rotated together with the shaft 146. The guide 144 is formed in a rectangular shape, as shown in FIG. 6. The worm 142 is formed at its axial center portion with a rectangular hole receiving the guide 144 therein. Therefore, the worm 142 is rotated together with the guide 144 and the shaft 146, but it is movable relatively thereto in an axial direction of the guide 144.

The relative movement of the worm 142 is restricted in one direction by a large diameter portion 144A formed on one end portion of the axial direction of the guide 144, namely, the worm 142 is restricted from movement in such a direction that the worm 142 is subjected to a reaction force of the spiral spring 140 through the spring case 134. Also, the guide 144 rotatably supports an actuator 150 close to opposite side portion of the guide 144 to the large diameter portion 144A through the worm 142. The actuator 150 is formed with a circular hole through which the guide 144 passes, whereby the actuator 150 is rotatable relative to the guide 144. Confined between the actuator 150 and one of the brackets 148 of the holder 128 is a compression coil spring 152 which is compressed in a direction of the worm 142, so that the compression coil spring 152 together with the worm 142 is subjected to the reaction force of the spiral spring 140 and it is movable in an axial direction of the shaft 146.

Figure 4:
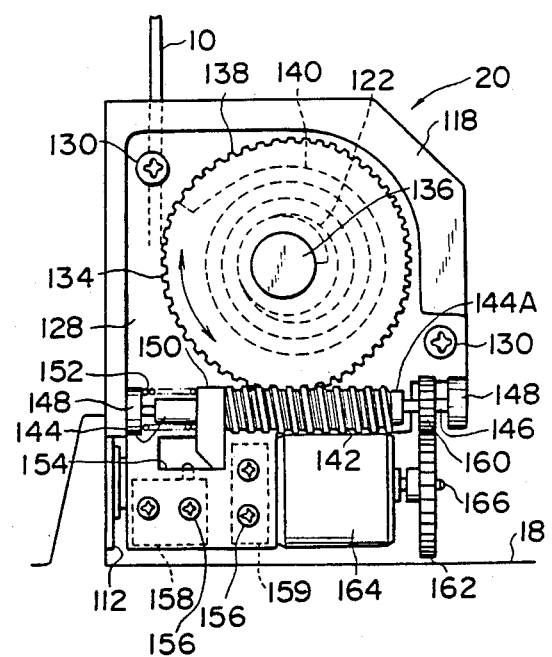
FIG. 4 is a left side view of FIG. 3.
Figure 7:
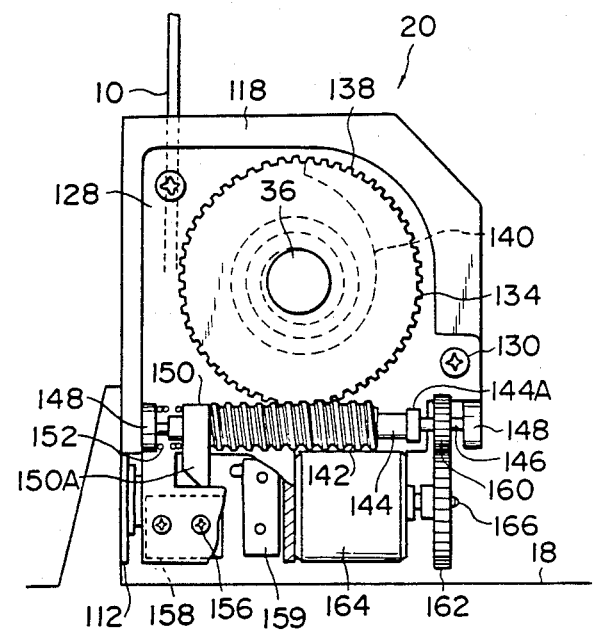
FIG. 7 is an operational view of FIG. 4.

FIGS. 4 and 5 show such a situation that the worm 142 and the actuator 150 are moved until the worm 142 is caused to abut on the large diameter portion 144A, in which the retracting force of the takeup shaft 122 owing to the biasing force of the spiral spring 140 is put in a weak condition. On the other hand, FIG. 7 shows such a situation that the worm 142 and the actuator 150 are moved against a biasing force of the compression coil spring 152 in a maximum amount in a reverse direction to the above direction, in which the retracting force of the takeup shaft 122 is put in a strong condition (where the occupant 30 is not subjected to a large pressure but he is weakly restrained by the webbing 10). When the actuator 150 is put at a middle position between the position shown in FIG. 4 and the position shown in FIG. 7, the retracting force of the takeup shaft 122 is put in a middle condition.

In the actuator 150 its leg portion 150A penetrates an opening 154 of the holder 128 and it is opposed to limit switches 158 and 159 fixed to a reverse face of the holder 128 through screws 156. The limit switches 158 and 159 are turned off when they are put in a separated situation from the leg portion 150A of the actuator 150, and they are turned on when they are caused to abut on the leg portion 150A. Accordingly, when the retracting force of the takeup shaft 122 is put in the strong condition shown in FIG. 4, the limit switch 158 is off and when the retracting force is put in the weak condition shown in FIG. 7 the limit switch 158 is on. On the contrary, the limit switch 159 is on in the condition shown in FIG. 5 and it is off in the condition shown in FIG. 7. Also, when the retracting force of the takeup shaft 122 is put in the middle condition both the limit switches 158 and 159 are off.

The shaft 146 is fixed close to the large diameter portion 144A with a pinion 160 which is engaged with a gear wheel 162. The gear wheel 162 is fixed to an output shaft 166 of a motor 164 fixed to the plate-shaped holder 128.

Figure 8:
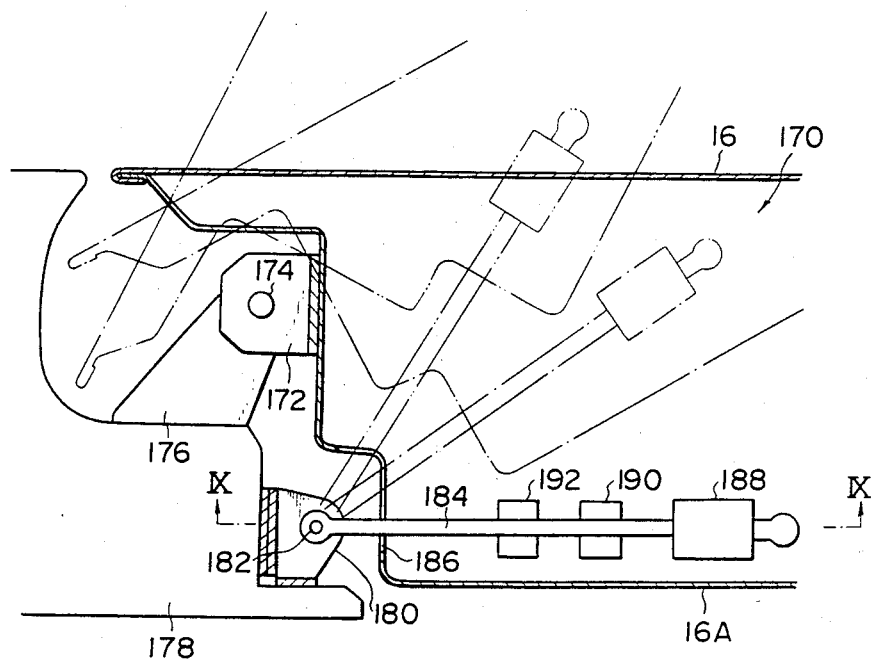
FIG. 8 is a sectional plan view showing a door-opening detecting means.
Figure 9:
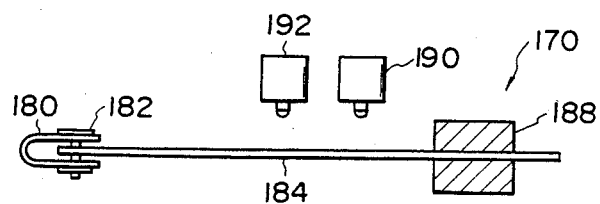
FIG. 9 is a sectional view taken along a line IX—IX of FIG. 8.

FIGS. 8 and 9 show a door-opening detecting means 170 detecting an opened degree of the door 16. An inner panel 16A of the door 16 is fixed at its one end portion of a front direction of the automobile with a hinge 172 which is pivoted to another hinge 176 through a pin 174. The hinge 176 is fixed to a front pillar 178 of the automobile, whereby the door 16 is rotatable from its closed situation shown with a full line in FIG. 8 to a full opened situation shown with a double dotted line in FIG. 8 through a half opened situation shown with a dotted line in FIG. 8.

The front pillar 178 is fixed with a bracket 180 which rotatably supports an arm 184 through a pin 182. The arm 182 is elongated into the door 16 through an opening 186 formed on the inner panel 16A and it is provided at its forward end portion with a checher 188 disposed in the door 16. When the door 16 is largely opened, the checher 188 functions to abut on a portion of the door 16, thereby restricting an opening angle of the door 16, or it functions to abut on a spring member (not shown) fixed to the door 16, thereby giving a resistance force to a rotation of the door 16 when the door 16 is opened at a predetermined angle.

In this embodiment limit switches 190 and 192 are monted so as to be opposed to the arm 184. When the door 16 is opened half the limit switch 190 is turned on, and when the door 16 is opened full the limit switch 192 is turned on. In this connection, the above full opened situation of the door 16 detected by the limit switch 192 means such a situation that the door 16 is opened beyond the above half opened situation of the door 16.

Figure 10:
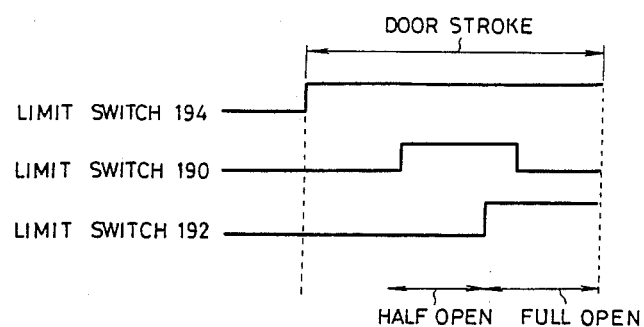
FIG. 10 is a timing chart showing opened and closed situations of limit switches with respect to a door stroke.

FIG. 10 shows situations detected by the limit switches 190 and 192 with respect of stroke of the door 16. In FIG. 10 a limit switch 194 is mounted on a rear side end portion of the door 16, as shown in FIG. 1 as one example. The limit switch 194 is turned off when the door 16 is closed, and when the door 16 is opened the limit switch 194 is turned on. Thus, the limit switch 194 is used as detect means for detecting a closed situation of the door 16.

Figure 11:
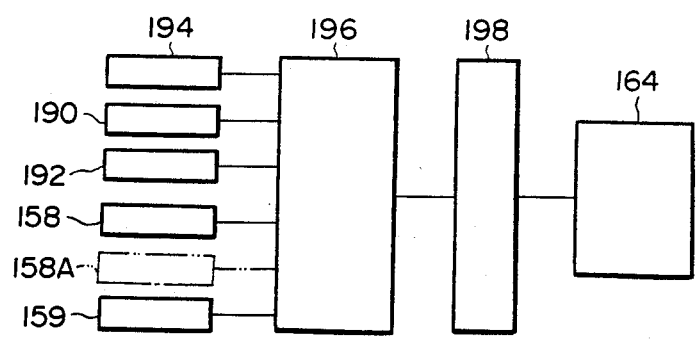
FIG. 11 is a circuit diagram showing a control circuit used in the first embodiment.

In FIG. 11 there is shown a control circuit for controlling the motor 164 as is control means. The control circuit including a microcomputer is such constructed that a control unit 196 drives the motor 164 through a power-supply circuit 198. Transmitted to the control unit 196 are outputs of the limit switches 158, 159, 190, 192 and 194, as described above.

The control unit 196 controls the motor 164 so as to put a tension of the webbing 10, i.e. the retracting force of the takeup shaft 122, in a weak condition, in which the tension is made very weak or it is made zero, until the door 16 is opened half after the door 16 closed is opened. Also, the control unit 196 controls the motor 164 so as to maintain the tension of the webbing 10 in a middle situation, in which a slack of the webbing 10 is cancelled, until the door 16 is closed from the half opened situation through the full opened situation of the door 16 in accordance with a closing operation of the occupant 30. Furthermore, after the 16 is closed, the control unit 196 controls to drive the motor 164 so as to put the tension of the webbing 10 in a strong condition, in which the occupant 30 is weakly restrained by the webbing 10.

Figure 12:
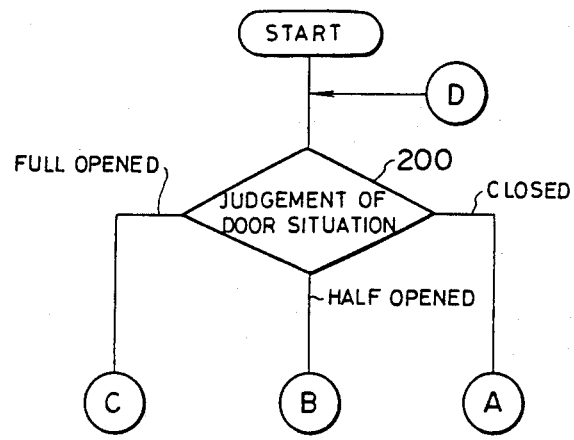
Figure 12:
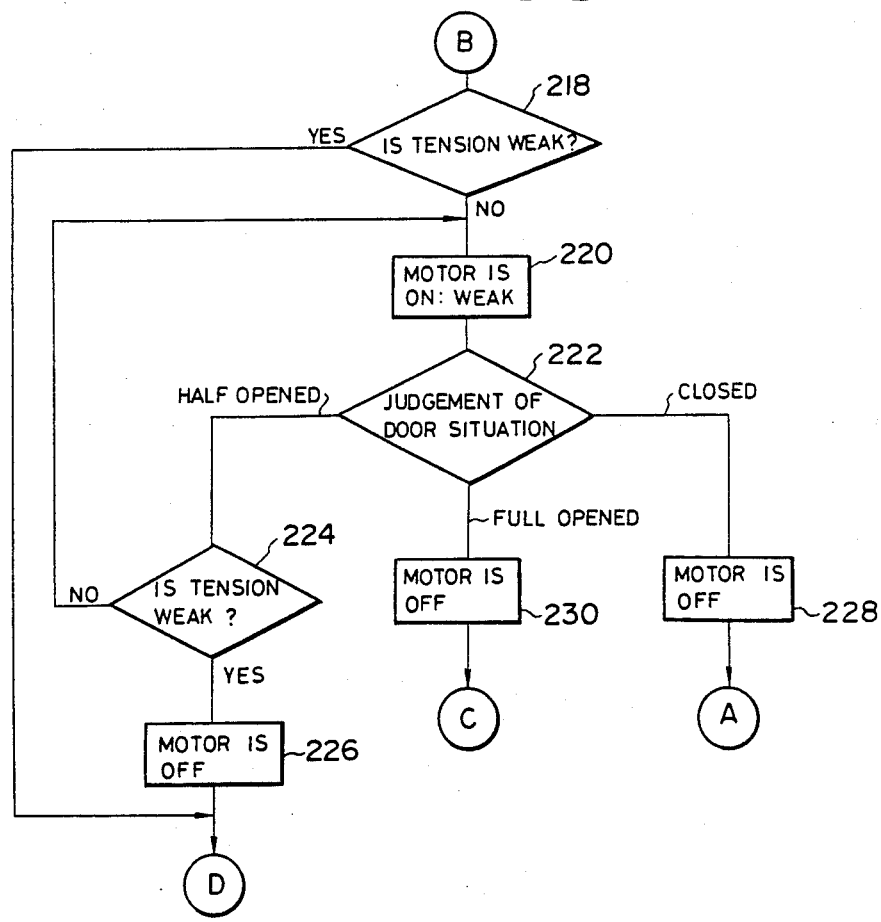
Figure 12:
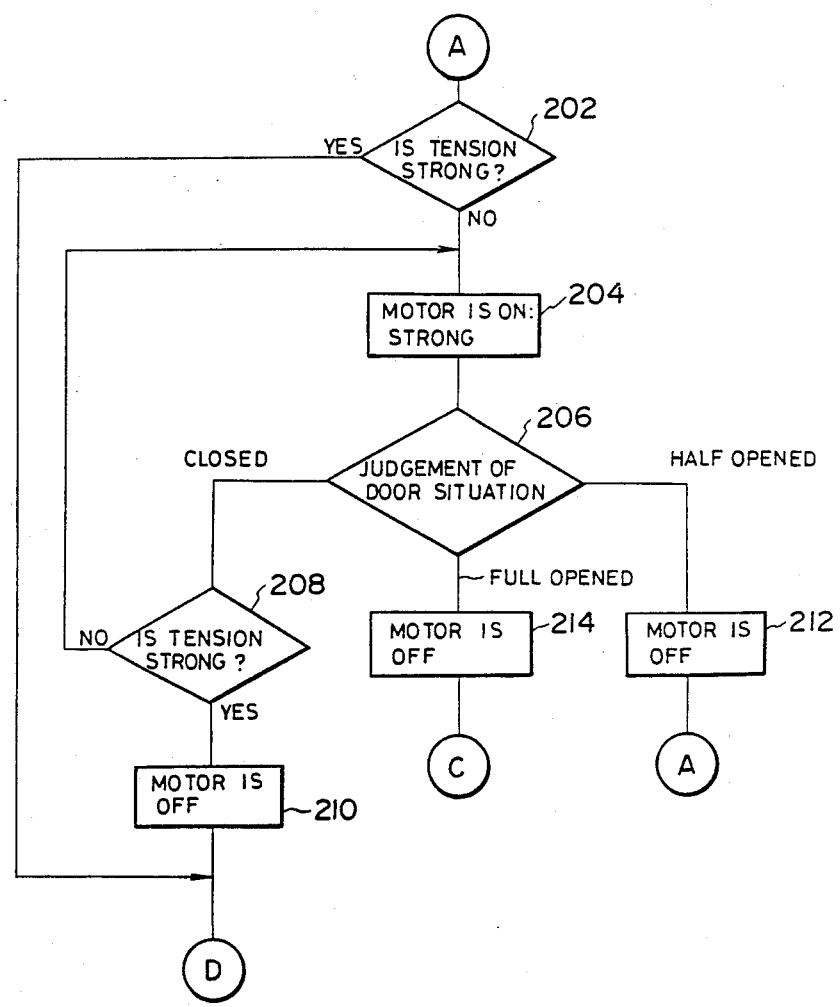
Figure 12:
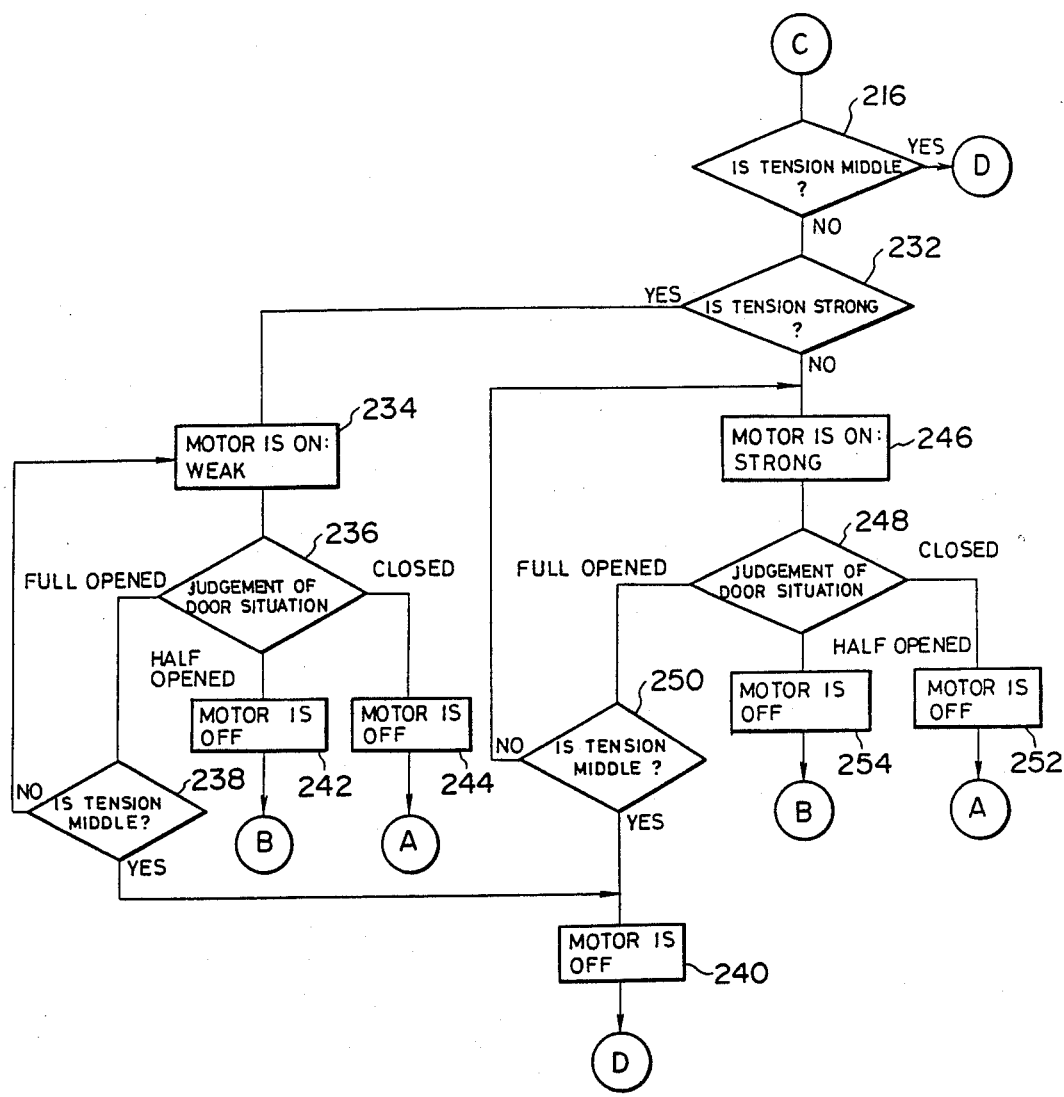

The embodiment thus constructed will now be given of operation with reference to FIG. 12.

In a step 200 of FIG. 12(A) it is judged whether the door 16 is half opened, full opened or closed. When the door 16 is closed, as shown in FIG. 2, the step 200 advances to a step 202 shown in FIG. 12(C). In the step 202 it is judged whether or not the tension of the webbing 10 is put in the strong condition.

In the closed situation of the door 16, as it is necessary for the occupant 30 to be weakly restrained by the webbing 10, the tension of the webbing 10 is put in the strong condition. The strong condition is detected by turning-on of the limit switch 158 of FIG. 4, and the step 202 returns back to the step 200 of FIG. 12(A) when the strong condition of the tension is detected.

Also, in case that the limit switch 158 is not on, which is detected by an off condition of the limit switch 158, the step 202 advances to a step 204 in which the motor 164 is rotated in a direction of the strong condition of the tension of the webbing 10. Thereafter, the step 204 advances to a step 206 in which it is again judged whether the door 16 is half opened, full opened or closed. In the case, if the door 16 is still put in the closed situation, the step 206 advances to a step 208 in which it is again judged whether or not the tension of the webbing 10 is put in the strong condition. In case that the tension is not put in the strong condition, the step 208 returns back to the step 204, but in case that the tension is put in the strong condition, the step 208 advances to a step 210 in where the rotation of the motor 164 is stopped and the step 210 returns back to the step 200.

In the step 206 when the door 16 is not closed, i.e., the dooor 16 is opened, it is detected by the limit switches 190, 192 and 194 whether the door 16 is half opened or full opened. In case that the door 16 is half opened, the step 206 advances to a step 212 in which a rotation of the motor 164 is stopped, and thereafter the step 212 returns back to the step 202. On the other hand, when the door 16 is full opened, the step 206 advances to a step 214 in which the rotation of the motor 164 is stopped, and thereafter the step 214 reaches a step 216.

In the step 200 shown in FIG. 12(A), when a half opened situation of the door 16 is detected, namely, in case that the door 16 is half opened by the occupant 30 in order to get off the automobile, the step 200 advances to a step 218. In this connection it is judged whether the door 16 is half opened, full opened or closed in accordance with signals generated from the limit switches 190, 192 and 194. In the step 218, when it is judged that the tension of the webbing 10 is put in the weak condition, i.e., when the limit switch 159 shown in FIG. 4 is on, the step 218 returns back to the step 200.

However, in case that the door 16 is opened up to the half opened situation in order to get off the automobile, the webbing 10 is unwound from the takeup shaft 20 in accordance with the opening motion of the door 16, so that the tension of the webbing 10 is made strong and the limit switch 159 is turned off. When it is detected in the step 218 that the tension of the webbing 10 is not put in the weak condition, the step 218 advances to a step 220 in which the motor 164 is rotated so as to weaken a biasing force of the spiral spring 140 and the step 220 advances to a step 222.

In the step 222 it is again judged whether the door 16 is closed, half opened or full opened, and when the door is still put in the half opened situation the step 222 advances to a step 224 in which it is again judged whether or not the tension of the webbing 10 is put in the weak condition. If the tension is not put in the weak condition, then the step 224 returns back to the step 220, but when the tension is put in the weak condition, the step 224 advances to a step 226 in which the rotation of the motor 164 is stopped and the step 226 returns back to the step 200.

Thus, since the tension of the webbing 10 is put in the weak condition at the beginning of the opening of the door 16, the occupant is not subjected to a pressure due to the tension of the webbing 10, whereby the door 16 can be opened comfortably for the occupant 30. In this case the webbing 10 may be disposed at a position shown with a double dotted line in FIG. 2 whereby the tension of the webbing 10 can be removed. In the step 222 when it is judged that the door 16 is put in the closed situation, namely, when the door 16 is closed again by the occupant 30, the step 222 advances to a step 228 in which the rotation of the motor 164 is stopped and thereafter the step 228 advances to the step 202. Also, in the step 222 when it is judged that the door 16 is put in the full opened situation, i.e., when the door 16 is opened from the half opened situation up to the full opened situation by the occupant 30, the step 222 advances to a step 230 in which the rotation of the motor 164 is stopped and the step 230 advances to the step 216.

When the door 16 is opened from the half opened situation to the full opened situation, it is judged in the step 216 of FIG. 12(D) whether or not the tension of the webbing 10 is put in the approximately middle condition. In case that the door 16 is put in the full opened situation, the tension of the webbing 10 is put in the approximately middle condition and, therefore, the webbing 10 relatively loosened in the half opened situation of the door 16 must be put in its slightly strained situation, thereby facilitating getting on and off the automobile, as shown in FIG. 1.

The tension of the webbing 10 put in the approximately middle condition is detected from the fact that neither the limit switch 158 nor the limit switch 159 is on, and the step 216 advances to the step 200. However, when the limit switch 158 is on, the step 216 advances to a step 232 in which it is judged whether or not the tension of the webbing 10 is put in the strong condition. If the tension is put in the strong condition, then the step 232 advances to a step 234 in which the motor 164 is on and it is rotated in such a direction as to weaken the retracting force of the takeup shaft 122.

Thereafter, the step 234 advances to a step 236 in which it is again judged with the door 16 is closed, half opened or full opened. If the door 16 is still opened, then the step 236 advances to a step 238 in which it is again judged whether or not the tension of the webbing 10 is put in the approximately middle condition. When the tension is not put in the approximately middle condition, the step 238 returns back to the step 234, but when the tension is put in the approximately middle condition the step 238 advances to a step 240 in which the rotation of the motor 164 is stopped, and the step 240 returns back to the step 200. Also, in the step 236 when it is detected that the door 16 is put in the half opened situation, namely, when the door 16 is moved from the full opened situation to the half opened situation by the occupant 30, the step 236 advances to a step 242 in which the rotation of the motor 164 is stopped and the step 242 returns back to the step 218. In the step 236 when it is detected that the door 16 is put in the closed situation, i.e., when the door 16 is moved from the full opened situation to the closed situation by the occupant 30, the step 236 advances to a step 244 in which the rotation of the motor 164 is stopped and the step 244 returns back to the step 202.

In case that the tension of the webbing 10 detected in the step 232 is not put in the strong condition, that is, when the limit switch 158 is off, the step 232 advances to a step 246 in which the motor 164 is rotated in such a direction as to increase the biasing force of the spiral spring 140. Thereafter the step 246 advances to a step 248 in which it is judged whether the door 16 is closed, half opened or full opened. When the door 16 is still put in the full opened situation, the step 248 advances to a step 250 in which it is detected whether or not the tension of the webbing 10 is put in the approximately middle condition. When the tension does not reach the approximately middle condition yet, the step 250 returns to the step 246, and when the tension reaches the approximately middle condition the step 250 advances to a step 240. Also, in the step 248 when it is detected that the door 16 is put in the half opened situation, i.e., when the door 16 is moved up to the half opened situation after the motor 164 is rotated in the direction of the increase of the retracting force in the step 246, the step 248 reaches the step 218 through a step 254 in which the rotation of the motor 164 is stopped. In the step 248 when it is detected that the door 16 is put in the closed situation, i.e., when the door 16 is moved up to the closed situation after the motor 164 is rotated in the direction of the increase of the retracting force in the step 246, the step 248 reaches the step 202 through a step 252 in which the rotation of the motor 164 is stopped.

Thus, when the door 16 is moved to the half opened situation after occupant 30 gets on the automobile, the tension of the webbing 10 is again put in the weak condition, whereby the occupant can automatically and comfortably be fastened by the webbing 10 and, after fasten, the webbing 10 is slightly retracted into the webbing retractor 20, so that the tension of the webbing 10 is put in the strong condition and the occupant 30 is weakly restrained by the webbing 10.

At need such a device as a timer can be used in order to remove the pressure to the occupant 30, whereby the tension of the webbing 10 can be decreased in such an extent that a slack of the webbing 10 is cancelled when a predetermined time lapses after the door 16 is closed.

FIG. 13 shows another door-opening detecting means 300 applied to a second embodiment according to the present invention. In the embodiment the arm 184 is provided at its forward end portion with the checher 188 as well as the first embodiment and it is provided at a reverse end to the forward end with an extension portion 302. The extension portion 302 is opposed to limit switches 304 and 306 mounted on the front pillar 118 and it functions as a striker. The limit switches 304 and 306 are respectively opposed to the extension portion 302 with respect to the door 16 half opened and full opened, whereby it is detected whether the door 16 is opened or closed in the same manner as the above first embodiment.

In the above embodiments the limit switches 158 and 159 are used for detecting the tension of the webbing 10, and it is detected that the tension of the webbing 10 is put in the approximately middle condition, only when both the limit switches 158 and 159 are off. However, another limit switch detecting the approximately middle condition of the tension of the webbing 10 can be disposed between the limit switches 158 and 159 shown in FIG. 4 as a limit switch 158A shown with a double dotted line in FIG. 11. In the present invention, also, the tension of the webbing 10 is not necessarily detected. That is to say, the present invention can be constructed so as to rotate the motor 164 by a predetermined amount in response to the opened degree of the door 16 in directions of decrease and increase of the biasing force of the spiral spring 140.

Furthermore, in the present invention another door-opening detecting means having such a construction that movement of handles mounted on an outside and an inside of the door 16 for opening and closing the door 16 is detected and thereby the opening and closing situations of the door 16 is detected can also be used instead of the limit switch 194.

Also, the webbing retractor used in the present invention, of course, is not limited only to the construction described in the above embodiment.

What is claimed is:

1. A seatbelt system adapted for preventing a movement of an occupant in an emergency situation of a vehicle, which comprises:
an occupant restraining webbing fixed with one end portion thereof to a door of the vehicle and moved in accordance with an opening and a closing of the door;
retracting means fixed to the vehicle body and for retracting the other end portion of the webbing therein;

door-opening detecting means for detecting opened degree of the door; and control means for changing a retracting force of the retracting means in accordance with the opened degree of the door in response to a door-opening detecting signal from the door-opening detecting means, whereby a resistance force to the opening of the door is reduced at a time of the opening and frictional resistance between the occupant and the webbing is decreased at a time of the movement of the webbing, wherein the door-opening detecting means is capable of detecting at least a closed situation, a half opened situation and a full opened situation of the door, and wherein the door-opening detecting means includes an arm moved relative to the door in accordance with the opened degree of the door and an electrical limit switch mounted on the door and detecting the movement of the arm.

2. A seatbelt system as set forth in claim 1, wherein the arm is fixed with one end thereof to the vehicle body and is drawn from the door in accordance with the opened degree of the door.

3. A seatbelt system as set forth in claim 2, wherein the arm is provided at its forward end portion with door checker.

4. A seatbelt system adapted for preventing a movement of an occupant in an emergency situation of a vehicle, which comprises:

an occupant restraining webbing fixed with one end portion thereof to a door of the vehicle and moved in accordance with an opening and a closing of the door;

retracting means fixed to the vehicle body and for retracting the other end portion of the webbing therein;

door-opening detecting means for detecting opened degree of the door; and control means for changing a retracting force of the retracting means in accordance with the opened degree of the door in response to a door-opening detecting signal from the door-opening detecting means, whereby a resistance force to the opening of the door is reduced at a time of the opening and a frictional resistance between the occupant and the webbing is decreased at a time of the movement of the webbing, wherein the door-opening detecting means includes an arm rotated together with the door and an electrical limit switch mounted on the vehicle body and detecting the rotation of the door.

5. A seatbelt system as set forth in claim 4, wherein the arm is rotatably supported to a portion of the vehicle body, one end portion of which is rotated together with the door, the other end portion thereof being opposed to the switch.

6. A seatbelt system as set forth in claim 5, wherein the arm is fixed with one end thereof to the vehicle body and is drawn from the door in accordance with the opened degree of the door.

7. A seatbelt system as set forth in claim 6, wherein the arm is provided at its forward end portion with a door checker.

8. A seatbelt system adapted for preventing a movement of an occupant in an emergency situation of a vehicle, which comprises:

an occupant restraining webbing ifxed with one end portion thereof to a door of the vehicle and moved in accordance with an opening and a closing of the door;

retracting means fixed to the vehicle body and for retracting the other end portion of the webbing therein;

door-opening detecting means for detecting opened degree of the door; and control means for changing a retracting force of the retracting means in accordance with the opened degree of the door in response to a door-opening detecting signal from the door-opening detecting means, whereby a resistance force to the opening of the door is reduced at a time of the opening and a frictional resistance between the occupant and the webbing is decreased at a time of the movement of the webbing, wherein the control means is capable of adjusting the retracting force of the retracting means to at least three steps.

9. A seatbelt system as set forth in claim 1, wherein the control means includes means for (A) putting the retracting force of the retracting means in a first condition in which the retracting force is made weak at the beginning of an opening of the door, (B) putting the retracting force in a second condition in which the retracting force is made stronger than that of the first condition from the half opened situation up to the full opened situation, and (C) putting the retracting force in a third condition in which the retracting force is made stronger than that of the second condition after the door is closed.

10. A seatbelt system as set forth in claim 9, wherein the control means controls to put the retracting force of the retracting means in its weak condition after the third condition, whereby a pressure to the occupant is reduced.

11. A seatbelt system adapted for preventing a movement of an occupant in an emergency situation of a vehicle, which comprises:

an occupant restraining webbing fixed with one end portion thereof to a door of the vehicle and moved in accordance with an opening and a closing of the door;

retracting means fixed to the vehicle body and for retracting the other end portion of the webbing therein;

door-opening detecting means for detecting opened degree of the door; and control means for changing a retracting force of the retracting means in accordance with the opened degree of the door in response to a door-opening detecting signal from the door-opening detecting means, whereby a resistance force to the opening of the door is reduced at a time of the opening and a frictional resistance between the occupant and the webbing is decreased, at a time of the movement of the webbing, wherein the retracting means includes a webbing takeup shaft, a first resilient member, one end thereof being fixed to the takeup shaft, biasing the takeup shaft in a direction of a retraction of the webbing, and driving means supporting the other end of the first resilient member and driving the other end thereof to change the retracting force of the retracting means.

12. A seatbelt system as set forth in claim 11, wherein the other end of the first resilient member is secured to a worm wheel, a worm engaged with the worm wheel is drived by a motor and a reaction force of the first resilient member acting upon the worm is detected.

13. A seatbelt system as set forth in claim 12, wherein the worm is movable in an axial direction thereof and it is biased in one direction by a second resilient member, a movement of the worm being detected at least at two positions.

14. A seatbelt system as set forth in claim 13, wherein limit switch is disposed at each of the two positions, and it is judged that the retracting force of the retracting means is put in a middle condition when the limit switches are not operated.

15. A seatbelt system adapted for preventing a movement of an occupant in an emergency situation of the vehicle, which comrpises:
- an occupant restraining webbing fixed with one end portion thereof to a door of the vehicle and moved in accordance with an opening and a closing of the door;
- retracting means fixed to the vehicle body and for retracting the other end portion of the webbing therein;
- door-opening detecting means for detecting opened degree of the door and capable of detecting at least a closed situation, a half opened situation and a full opened situation of the door; and of
- control means for changing a retracting force the retracting means in accordance with the opened degree of the door in response to a door-opening detecting signal from the door-opening detecting means, whereby a resistance force to the opening of the door is reduced at a time of the opening and a frictional resistance between the occupant and the webbing is decreased at a time of the movement of the webbing,
- wherein the door-opening detecting means includes an arm moved relative to the door in accordance with the opened degree of the door and an electrical limit switch mounted on the door and detecting the movement of the arm.

16. A seatbelt system adapted for preventing a movement of an occupant in an emergency situation of the vehicle, which comprises:
- an occupant restraining webbing fixed with one end portion thereof to a door of the vehicle and moved in accordance with an opening and a closing of the door;
- retracting means fixed to the vehicle body and for retracting the other end portion of the webbing therein;
- door-opening detecting means for detecting opened degree of the door and capable of detecting at least a closed situation, a half opened situation and a full opened situation of the door; and
- control means for changing a retracting force of the retracting means in accordance with the opened degree of the door in response to a door-opening detecting signal from the door-opening detecting means, whereby a resistance force to the opening of the door is reduced at a time of the opening and a frictional resistance between the occupant and the webbing is decreased at a time of the movement of the webbing,
- wherein the door-opening detecting means includes an arm rotated together with the door and an electrical limit switch mounted on the vehicle body and detecting the rotation of the door.

* * * * *